United States Patent [19]

Flower

[11] 4,398,078
[45] Aug. 9, 1983

[54] FINISHING OF ANNULAR ARTICLES

[76] Inventor: Ralph F. J. Flower, "Littledean", Bath Rd., Devizes, Wiltshire, England

[21] Appl. No.: 153,877

[22] Filed: May 28, 1980

[30] Foreign Application Priority Data

May 30, 1979 [GB] United Kingdom ................. 7918729

[51] Int. Cl.³ ............................................... B23P 1/08
[52] U.S. Cl. .............................. 219/69 M; 219/69 R; 219/159; 51/104; 51/105 R; 51/236; 51/237 R; 266/57
[58] Field of Search ................................ 219/158–161, 219/59.1, 60 A, 69 R, 69 M, 137 R; 51/67, 104, 105 R, 106 R, 236, 237 R, 103 R; 266/56–58; 82/1.2

[56] References Cited

U.S. PATENT DOCUMENTS

| | | | |
|---|---|---|---|
| 2,927,404 | 3/1960 | Shoffner | 51/239 X |
| 3,066,457 | 12/1962 | Moore | 51/237 R |
| 3,080,843 | 3/1963 | Abbott et al. | 219/159 X |
| 3,604,080 | 9/1971 | Smith | 219/69 M |
| 3,920,947 | 11/1975 | Wachtell et al. | 219/69 M |
| 3,930,343 | 1/1976 | Welsch et al. | 51/237 R |

Primary Examiner—M. H. Paschall
Attorney, Agent, or Firm—Emory L. Groff, Jr.

[57] ABSTRACT

A method of finishing an annular component such as a brush seal to a substantially uniform wall thickness, and apparatus therefor. Two rollers are mounted with their axes parallel, one roller being spatially fixed and the other biassed by a spring towards said one roller, whereby the annular article may be held therebetween. A machining operation, such as centerless grinding or centerless electro-discharge errosion is performed on the article as the article is turned by power-driving at least one of the two rollers, the machining operation using the spatially fixed roller as a reference surface for the machining.

15 Claims, 3 Drawing Figures

FINISHING OF ANNULAR ARTICLES

BACKGROUND OF THE INVENTION (a) Field of the Invention

This invention relates to the finishing of annular articles, such as rings, cylinders and the like, and the invention in particular but not exclusively relates to the finishing of annular seals such as brush seals for sealing a rotatable shaft to a housing therefor.

The term "annular" as used herein when referring to the article to be finished is intended to extend to articles having shapes bound by two similar concentric curviform figures, such as elipses, as well as truly circular shapes bound by two concentric circles.

(b) Description of the Prior Art

A lathe is a known form of apparatus for finishing annular articles, in which the article is held between two rotatable members arranged co-axially, and a cutting tool is caused to remove material from the article as it rotates. The cutting tool may be replaced by a grinding wheel when high quality surface finishes are required. It is however often difficult to hold an annular article in a lathe and complex jigs may have to be specially provided. Then, production is low, and it can take several minutes to align each article ready for machining. To overcome these problems, centreless grinding machines are known, but in the case of an annular article having a relatively short axial length it can still be most difficult to hold the article sufficiently reliably to obtain an accurately finished article. Particularly in the case of a brush seal having a plurality of metallic bristles projecting from an annular carrier, the holding of the seal sufficiently firmly so as to be able to perform a finishing operation on the carrier or on the bristles themselves can be most troublesome.

OBJECTS OF THE INVENTION

It is a general object of this invention to provide a method of and apparatus for finishing an annular article, which at least reduce the disadvantages mentioned above for known finishing techniques.

More specifically, it is an object of this invention to provide a method of finishing an annular article so as to provide a substantially uniform wall thickness. A further object is to provide apparatus for performing such methods, in order that an annular article can rapidly and simply be finished to a uniform wall thickness.

Yet another object is to provide a method of finishing a seal intended to effect a seal between a rotatable element and a housing therefor, which seal is in the form of a carrier having a plurality of bristles projecting generally radially, in which method the bristles of the brush seal are all finished to substantially the same length.

SUMMARY OF THE INVENTION

In accordance with the foregoing and other objects, one aspect of this invention provides a method of finishing an annular article to provide a substantially constant radial wall thickness, which method comprises holding said article between at least one pair of rotatable members mounted on a frame with the axes of the rotatable members substantially parallel, one rotatable member being spatially fixed and engaging the inner or outer circumference of the article and the other rotatable member being biassed in a direction normal to its axis of rotation so as to be urged towards the spatially fixed rotatable member so as also to engage the article, driving at least one of the rotatable members to cause the article to be rotated, and removing unwanted material from the article during the rotation thereof by a machining device appropriately juxtaposed to the rotating article, the spatially fixed rotatable member providing a reference surface to which the machining operation is related.

Further, according to another aspect of this invention there is provided apparatus for removing material from one of the inner and outer circumferences of an annular article to provide a substantially uniform wall thickness, which apparatus comprises a frame, at least one pair of rotatable members supported on the frame with the axes of the rotatable members substantially parallel, one rotatable member being spatially fixed and means being provided to bias the other rotatable member in a direction normal to its axis of rotation towards said spatially fixed rotatable member whereby the article may be held between said rotatable members with the inner and outer circumferences engaged by said two rotatable members, power drive means arranged to effect rotation of at least one of the rotatable members thereby to rotate a held article, and machining means adapted to remove material from one of the inner and outer circumferences of the article, the spatially fixed roller serving as a reference surface for the machining means.

BRIEF DESCRIPTION OF THE DRAWINGS

The invention will now be described in greater detail and two specific embodiments of apparatus of this invention given, reference being made to the accompanying drawings, as appropriate. In the drawings.

DESCRIPTION OF THE PREFERRED EMBODIMENTS

Figure 1:
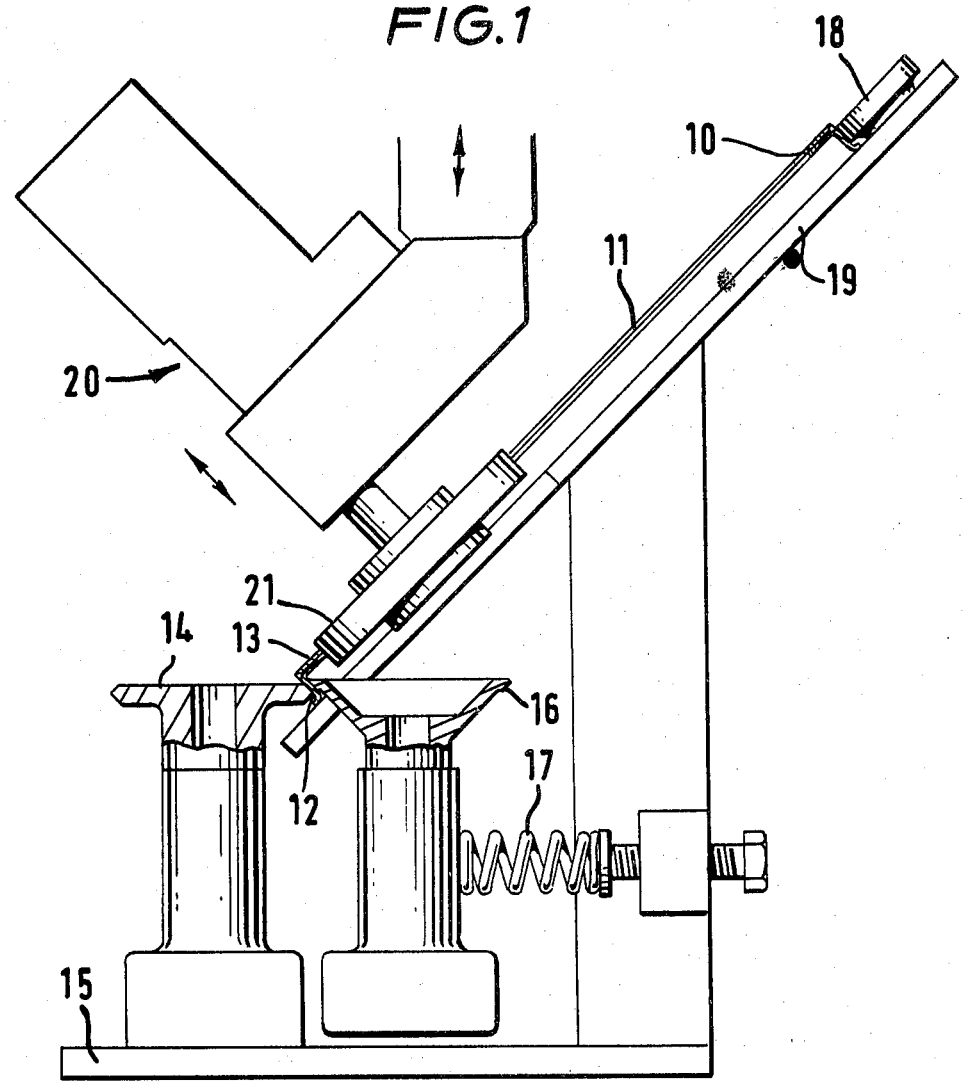
FIG. 1 shows the important parts of an electro-discharge machine, arranged to conform with this invention.

When performing the method of this invention, the article may additionally be supported during the machining operation by freely rotatable guide rollers positioned about the periphery of the article. Such further rollers are especially required should the article be in the form of a split annulus—that is to say, having a radially—extending split or cut at some point on the periphery thereof, as would be the case if the annulus were formed from a length of material, such as wire, suitably shaped.

Various machining operations may be performed, as appropriate for the article being finished. For instance, the article may be subjected to a centreless bore grinding operation as the article is rotated, thereby to finish the article. Alternatively, the article may be subjected to a centreless electro-discharge operation as the article is rotated, in which case it is preferred for there to be an electro-discharge head having a substantially circular electrode rotatable about its own axis, the head being mounted on a frame for movement both substantially vertically and substantially parallel to the axis of rotation of the electrode, the electro-discharge head being actuated as the article is rotated. The head actuation advantageously comprises reciprocating the electrode along an axis parallel to the axis of rotation thereof as the machining progresses, whilst the electro-discharge spark gap is automatically servo-controlled by effecting substantially vertical movement of the head as appropriate during the machining operation.

The method of this invention is particularly useful in the production of an annular article of circular cross-sectional shape, such as a brush seal as referred to in British Patent Specification No. 1450553 as well as in our British Patent Specification No. 2022197A. Brush seals of this type tend to have a relatively thin axial thickness and also a relatively thin radial wall thickness, and as a consequence it is difficult to maintain true circularity during the manufacture thereof, but provided that the seal is manufactured with a substantially constant wall thickness, the seal may then take up a true circular form when assembled in a housing, for sealing against a rotatable member. The method of this invention advantageously is used to produce the substantially constant radial wall thickness, in a finishing operation for the seal.

Using the invention, articles having walls of various sections can be produced. The walls may thus have grooves machined or otherwise formed therein, or may have a rectangular, square, circular or curved cross-section; further possibilities include the production of walls with flanges projecting therefrom. Moreover, an article being held and rotated in accordance with this invention may itself have a true circular overall cross-sectional shape, or may have for example an elliptical overall cross-sectional shape.

Turning now to the apparatus of this invention, two embodiments of which will be described in detail, the frame may freely rotatably support further rollers to guide and support the annular article when held between the rotatable members, the article preferably being held with the axis thereof extending at an angle part way between horizontal and vertical—for instance at 45° to the horizontal.

Depending on the article to be finished, the machining means may take any one of a variety of forms. For instance, a centreless bore grinding machine may be used for substantially rigid articles. Especially for brush seals, a centreless electro-discharge machine may be used, preferably having an electro-discharge head carrying a substantially circular electrode mounted for rotation about its own axis, the head being mounted on a frame for movement both generally vertically and parallel to the axis of rotation of the electrode. Conveniently, servo-control means are provided automatically to control the vertical movement of the head thereby to adjust the spark gap between the article and the rotatable electrode, when in operation.

Specifically referring to the drawings, there are shown two embodiments of apparatus intended to finish brush seals, such as are described in our Published British Patent Specification No. 2022197A. Such brush seals are annular with a substantially circular cross-sectional shape, and may be finished to a substantially constant radial wall thickness by employing the method of this invention.

FIG. 1 shows a centreless electro-discharge machine adapted for machining the metal bristles 10 of an annular brush seal 11 having one root plate 12 generally of Z-section, and another root plate 13 of generally flat shape, the bristles 10 projecting inwardly of the seal. The seal 11 is supported between a fixed position driving roller 14 rotatably mounted on the machine frame 15, and a further driving roller 16 which is urged by means of a spring 17 towards the roller 14. Guide rollers 18 are disposed around a support plate 19 also mounted on the machine frame 15, to support and assist movement of the seal 11. The rollers 14 and 16 are both driven by a motor (not shown) through suitable gearing (also not shown) so as to effect rotation of the seal 11 about its axis. The machine includes an electro-discharge head 20 having a circular rotatable electrode 21, the head being appropriately mounted on the machine frame for movement both vertically and parallel to the axis of rotation of the electrode 21. A tank (not shown) surrounds the part of the machine where the discharge takes place, for containing an appropriate dielectric liquid.

In operation, the brush seal 11 is rotated by driving the rollers 14 and 16, whilst the bristles are machined by the rotating tool element or electrode 21. As the seal rotates, the electrode 21 is caused to reciprocate about its own axis, whilst the spark gap automatically is servo-controlled by vertical movement of the head. It is preferred to position the general plane of the seal 11 at an angle to the horizontal—such as at 45°, as shown—in order to help the servo-action of the cutting electrode in sensing the bore of the seal as the seal is rotated. Normally the cutting electrode will be immersed in a dielectric liquid, a suitable electrode being made for example of carbon, copper or a copper alloy. The outer diameter of the seal may be machined in a generally similar manner, as may seals having root plates of shapes other than those shown in FIG. 1.

Figure 2:
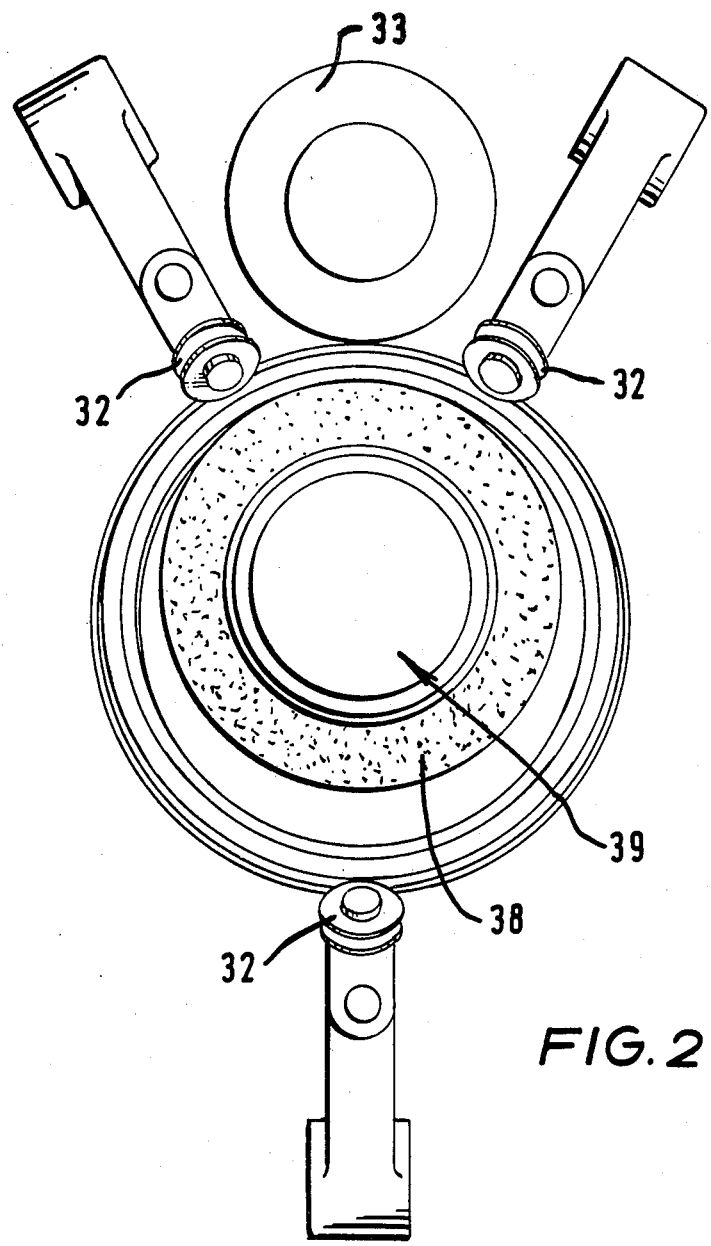
FIG. 2 shows a plan view through a centreless bore-grinding machine also arranged to conform with the method of this invention.
Figure 3:
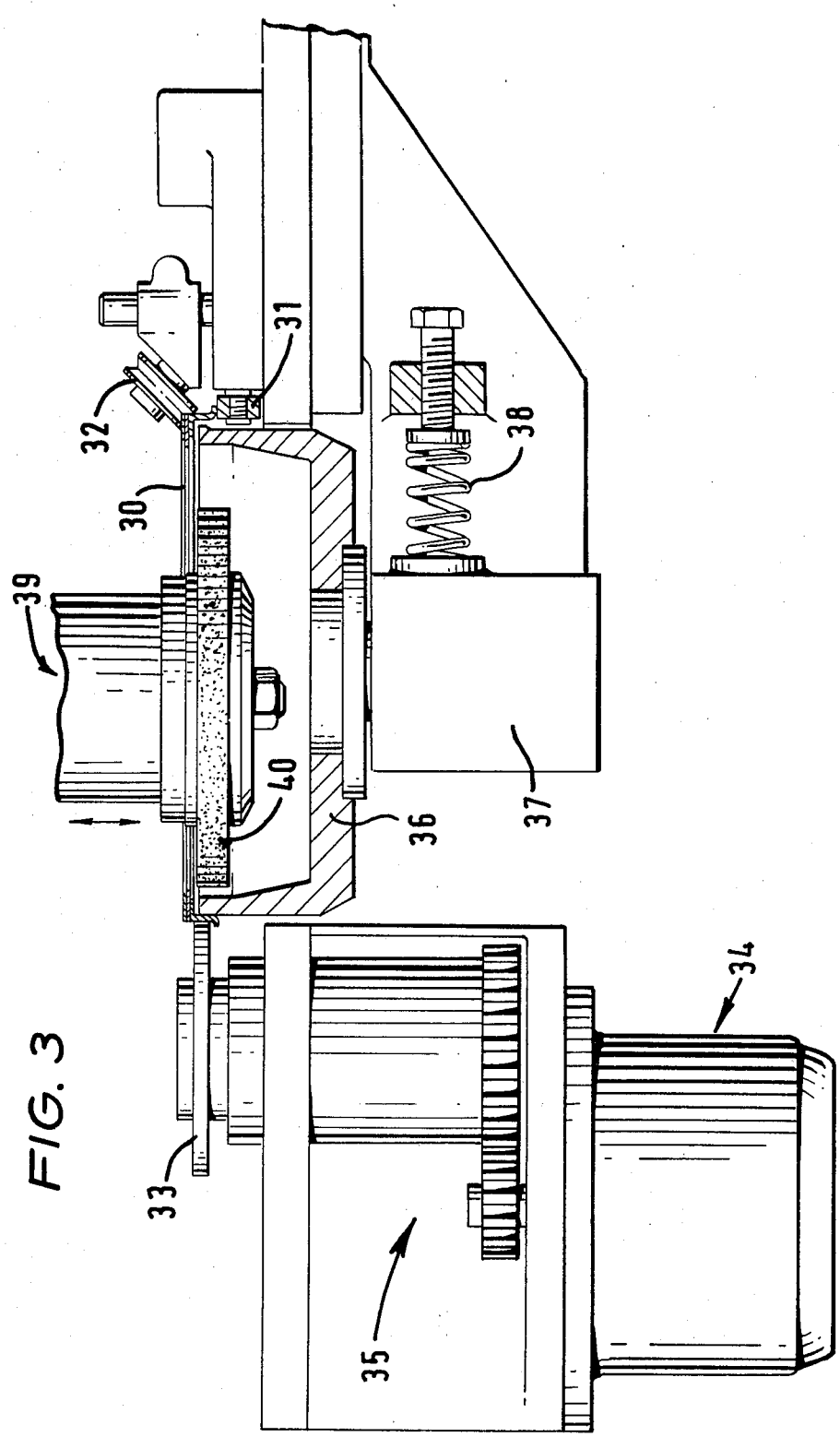
FIG. 3 shows a vertical section through the bore-grinding machine of FIG. 2.

Referring now to FIGS. 2 and 3, there is shown a vertical centreless bore-grinding machine being used to finish the bristles of a seal 30 generally similar to seal 11 shown in FIG. 1. The seal is carried by three support rollers 31 (only one of which can be seen in FIG. 3), idler rollers 32 running on the periphery of the seal to hold it in the required position. A drive roller 33 is urged into engagement with the periphery of the seal, and is power-driven by means of a motor 34 operating through a suitable gear train 35. A control wheel 36 is rotatably mounted on a sub-frame 37 urged by a spring loading mechanism 38 towards the drive roller 33, the control wheel engaging an internal face of the seal root plate to urge the seal into engagement with the drive roller 33, so that the seal will be rotated about its axis on operation of the machine.

A grinding head 39 including a power-driven tool element or grinding wheel 40 is mounted on the machine, for vertical movement relative to the supported seal 30. In operation, the seal is rotated by driving the roller 33 whilst the grinding wheel 40 is rotated and the grinding head 39 is reciprocated vertically. In this way, the internal bore can be ground accurately, so that the radial thickness of the seal is substantially constant.

I claim:

1. A method of finishing an annular article having a peripheral wall to provide an annular article having a substantially constant radial thickness, which method comprises holding said article between at least one pair of radially adjacent rotatable members mounted on a frame with the axes of said rotatable members substantially parallel, one said rotatable member being spatially fixed and engaging the inner or outer circumference of said article peripheral wall and the other said rotatable member being biased in a direction normal to its axis of rotation so as to be urged towards said spatially fixed and radially adjacent rotatable member so as also to engage said article peripheral wall circumference radially aligned with and immediately juxtaposed that circumference engaged by said one rotatable member, driving at least one of said rotatable members to cause the article to be rotated, and removing unwanted material from the article during the rotation thereof by operation of machining means juxtaposed the rotating article, the spatially fixed rotatable member providing a reference surface against which the machining operation is carried out to insure formation of a constant radial wall thickness regardless of the planar configuration of the annular article, said machining means including a head having a substantially circular tool element rotatable about its own axis and mounted with its axis at an angle to the vertical, the head being mounted on a frame for movement both substantially vertically and substantially parallel to the axis of rotation of the tool element, the machining operation being performed by actuating the head as the article is rotated.

2. A method as claimed in claim 1, in which the periphery of the article is additionally supported during the machining operation by freely rotatable guide rollers suitably positioned about the periphery of the article.

3. A method as claimed in claim 1 in which said step of removing unwanted material from the article is achieved by a centreless bore grinding operation as the article is rotated thereby to finish the article.

4. A method as claimed in claim 1, in which said step of removing unwanted material from the article is achieved by a centreless electro-discharge operation as the article is rotated thereby to finish the article.

5. A method as claimed in claim 1, in which said annular article is held such that the axis thereof lies at an angle part-way between horizontal and vertical as the article is rotated.

6. A method as claimed in claim 1, as applied to the finishing of a brush seal so as to have a substantially uniform radial thickness in which the machining operation is performed on the projecting bristles of the brush seal.

7. Apparatus for removing material from one of the inner and outer circumferences of the peripheral wall of an annular article to provide a substantially uniform wall thickness, which apparatus comprises a frame, at least one pair of adjacent rotatable members each having an axis of rotation and supported on the frame with the axes of the rotatable members substantially parallel, one said rotatable member being spatially fixed, means biasing the other said rotatable member in a direction normal to its axis of rotation towards said spatially fixed rotatable member, said article peripheral wall insertable between said rotatable members with radially adjacent inner and outer circumferences thereof engaged by said two rotatable members, power drive means operable to effect rotation of at least one of said rotatable members to rotate said engaged article, and machining means adapted to remove material projecting from one of the inner and outer circumferences of the article with said spatially fixed rotatable member serving as a reference surface for said machining means, the machining means having a head including a substantially circular tool element mounted for rotation about its own axis on the head, the head being mounted on a frame for movement both generally vertically and parallel to the axis of rotation of the electrode which axis is at an angle to the vertical.

8. Apparatus as claimed in claim 7, in which the machining means is a centreless bore-grinding machine.

9. Apparatus as claimed in claim 7, in which the machining means is a centreless electro-discharge machine.

10. Apparatus as claimed in claim 7, in which said pair of rotatable members is arranged to hold the article with the axis thereof extending at an angle part way between horizontal and vertical.

11. A method of finishing an annular article having a peripheral wall to provide an annular article having a substantially constant radial thickness, which method comprises holding said article between at least one pair of radially adjacent rotatable members mounted on a frame with the axes of said rotatable members substantially parallel, one said rotatable member being spatially fixed and engaging the inner or outer circumference of said article peripheral wall and the other said rotatable member being biased in a direction normal to its axis of rotation so as to be urged towards said spatially fixed and radially adjacent rotatable member so as also to engage said article peripheral wall circumference radially aligned with and immediately juxtaposed that circumference engaged by said one rotatable member, driving at least one of said rotatable members to cause the article to be rotated and removing unwanted material from the article during the rotation thereof by a centreless electro-discharge device juxtaposed to the rotating article, the spatially fixed rotatable member providing a reference surface against which the machining operation is carried out to insure formation of a constant radial wall thickness regardless of the planar configuration of the annular article, said electro-discharge device having a beam including a substantially circular electrode rotatable about its own axis and mounted with its axis at an angle to the vertical, the head being mounted on a frame for movement both substantially vertically and substantially parallel to the axis of rotation of the electrode, the electro-discharge operation being performed by actuating the head as the article is rotated.

12. A method as claimed in claim 11, in which the actuation of the head comprises rotating the electrode about its own axis and simultaneously reciprocating the head along an axis parallel to the axis of rotation of the electrode as the machining progresses, and automatically servo-controlling the electro-discharge spark gap by effecting substantially vertical movement of the head as appropriate during the machining operation.

13. Apparatus for removing material from one of the inner and outer circumferences of the peripheral wall of an annular article to provide a substantially uniform wall thickness, which apparatus comprises a frame, at least one pair of adjacent rotatable members each having an axis of rotation and supported on the frame with the axes of the rotatable members substantially parallel, one said rotatable member being spatially fixed, means biasing the other said rotatable member in a direction normal to its axis of rotation towards said spatially fixed rotatable member, said article peripheral wall insertable between said rotatable members with radially adjacent inner and outer circumferences thereof engaged by said two rotatable members, power drive means operable to effect rotation of at least one of said rotatable members to rotate said engaged article, and a centerless electro-discharge machine adapted to remove material projecting from one of the inner and outer circumferences of the article with said spatially fixed rotatable member serving as a reference surface for said electro-discharge machine, the electro-discharge machine having an electro-discharge head including a substantially circular electrode mounted for rotation about its own axis on the head, the head being mounted on a frame for movement both generally vertically and parallel to the axis of rotation of the electrode which axis is at an angle to the vertical.

14. Apparatus as claimed in claim 13, in which there is provided servo-control means automatically to control the vertical movement of the head thereby to adjust the spark gap between the article and the rotatable electrode.

15. Apparatus as claimed in claim 7 including, freely rotatable rollers guiding and supporting the annular article when held between said rotatable members.

* * * * *